United States Patent
Lysak et al.

(10) Patent No.: US 10,891,319 B2
(45) Date of Patent: Jan. 12, 2021

(54) EASY CLUSTERING OF GRAPHS OF NODES PRESERVING NODE RELATIONSHIPS

(71) Applicant: International Business Machines Corporation, Armonk, NY (US)

(72) Inventors: Maksym Lysak, Waedenswil (CH); Viktor Kuropiatnyk, Horgen (CH); Nikolaos Livathinos, Adliswil (CH); Abderrahim Labbi, Gattikon (CH)

(73) Assignee: International Business Machines Corporation, Armonk, NY (US)

( * ) Notice: Subject to any disclaimer, the term of this patent is extended or adjusted under 35 U.S.C. 154(b) by 111 days.

(21) Appl. No.: 16/354,779

(22) Filed: Mar. 15, 2019

(65) Prior Publication Data
US 2020/0293556 A1    Sep. 17, 2020

(51) Int. Cl.
| | |
|---|---|
| G06F 15/177 | (2006.01) |
| G06F 16/28 | (2019.01) |
| G06F 3/0484 | (2013.01) |
| G06F 16/22 | (2019.01) |
| G06F 16/29 | (2019.01) |

(52) U.S. Cl.
CPC ........ G06F 16/287 (2019.01); G06F 3/04845 (2013.01); G06F 16/2272 (2019.01); G06F 16/29 (2019.01)

(58) Field of Classification Search
CPC .. G06F 16/287; G06F 16/285; G06F 3/04845; G06F 3/04842; G06F 16/355; G06F 3/358
See application file for complete search history.

(56) References Cited

U.S. PATENT DOCUMENTS

| | | | |
|---|---|---|---|
| 8,745,516 B2 | 6/2014 | Mason et al. | |
| 9,552,129 B2 | 1/2017 | Ramos et al. | |
| 9,594,773 B2 | 3/2017 | Herron | |
| 9,836,183 B1* | 12/2017 | Love | G06F 16/9024 |
| 2007/0268310 A1 | 11/2007 | Dolph et al. | |
| 2009/0100363 A1 | 4/2009 | Pegg et al. | |
| 2009/0204582 A1* | 8/2009 | Grandhi | G06F 16/1873 |
| 2010/0313157 A1* | 12/2010 | Carlsson | G06F 3/0484 |
| | | | 715/769 |
| 2011/0010650 A1 | 1/2011 | Hess et al. | |

(Continued)

OTHER PUBLICATIONS

Ivan Herman et al., Graph Visualization and Navigation in Information Visualization: A Survey, Jan. 1, 2000, IEEE Xplore, vol. 6, No. 1, pp. 24-43 (Year: 2000).*

(Continued)

*Primary Examiner* — Tam T Tran
(74) *Attorney, Agent, or Firm* — Scully, Scott, Murphy & Presser, P.C.; Daniel P. Morris

(57) ABSTRACT

Real-time rendering representations of objects in a view. Objects include clusters of nodes of a graph structure and links between said clusters. The graph structure comprises edges defined as pairs of the nodes. User inputs in respect to a current view and/or at least one of the objects is received. A data structure is updated, which associates multiple identifiers. Multiple identifiers may include cluster identifiers, node identifiers, and link identifiers, which respectively identify clusters of nodes, nodes of said graph, and links between pairs of clusters.

19 Claims, 6 Drawing Sheets

(56) References Cited

U.S. PATENT DOCUMENTS

2015/0364118 A1   12/2015   Dai et al.

OTHER PUBLICATIONS

David Koop et al., Visual Summaries for Graph Collections, Feb. 1, 2013, IEEE Xplore, pp. 57-64 (Year: 2013).*
Hajij, M., et al., "MOG: Mapper on Graphs for Relationship Preserving Clustering", arXiv:1804.11242v1, Apr. 3, 2018, 11 pages.
Soor, S., et al., "Extending K-means to Preserve Spatial Connectivity", IEEE International Geoscience and Remote Sensing Symposium (IGARSS), Jul. 2018, Submitted Jan. 17, 2018, 5 pages.
Mahe, L., et al., "Too Many Markers!", https://web.archive.org/web/20160426225835/https://developers.google.com/maps/articles/toomanymarkers, Dec. 2010, Accessed on Mar. 13, 2019, 10 pages.
Herman, I., et al., "Graph visualization and navigation in information visualization: A survey", IEEE Transactions on Visualization and Computer Graphics, Jan.-Mar. 2000, pp. 24-43, vol. 6, No. 1.

* cited by examiner

US 10,891,319 B2

EASY CLUSTERING OF GRAPHS OF NODES PRESERVING NODE RELATIONSHIPS

BACKGROUND

The present disclosure relates in general to the field of computerized techniques for real-time (dynamic) rendering representations of objects including clusters of nodes, as well as related computerized devices and computer programs. In particular, this present disclosure discloses methods that rely on the properties of the nodes as displayed in the view for (de)clustering purposes, while retaining properties of edges of the node graph at the cluster-level.

Displaying a large number of individual markers on a map in readable fashion is a well-known problem, notably in the field of geo-spatial visualization. Various clustering techniques have been proposed to declutter images with numerous markers (or individual points of interest) superimposed on a map, for example. Some of these techniques have been designed for real-time execution. However, such techniques do not extend to the display of decluttered, easy-to-read images of interconnected nodes of a graph (each node representing a point of interest), where relationships between the nodes are preserved on the cluster-level.

For instance, grid-based clustering techniques can be used to display decluttered collections of markers. This technique does not require heavy pre-processing of input data. Such techniques are accordingly suited for real-time rendering of a large number of individual markers (points) overlaid on the map. However, the rendered objects do not account for node relationships. Conversely, techniques exist, which allow to render relationships (edges) between nodes of a graph structure, irrespective of other properties of interest of the nodes, e.g., their geo-spatial positions.

SUMMARY

According to a first aspect, the present invention is embodied as a computer-implemented method of real-time rendering representations of objects in a view. Said objects include clusters of nodes of a graph structure and links between said clusters. The graph structure comprises edges defined as pairs of the nodes, in addition to said nodes. The method comprises the following steps, all performed at run-time. First, user inputs in respect to a current view and/or one or more of the objects are received. Second, a data structure is updated, which associates multiple identifiers. The latter include cluster identifiers, node identifiers, and link identifiers, which respectively identify clusters of nodes, nodes of said graph, and links between pairs of clusters. The data structure is updated as follows. Properties of nodes in the view to be rendered are computed based on the user inputs received and corresponding node identifiers are selected. Then, cluster identifiers associated to the selected node identifiers are updated, based on the computed properties of the nodes. Finally, link identifiers associated to the updated cluster identifiers are updated, according to edges between pair of nodes connected to the selected node identifiers. After having updated the data structure, representations of clusters and links (as identified by corresponding cluster identifiers and associated link identifiers in the updated data structure) are rendered in the view.

According to another aspect, the invention is embodied as a computerized device. The latter comprises a display, processing means, and a memory. The memory stores computerized methods for real-time rendering representations of objects in a view, as described above. I.e., the execution of such methods by the processing means causes (at run-time) to receive user inputs, update a data structure, and accordingly render representations of clusters and links as described above.

According to yet another aspect, the invention is embodied as a computer program product for real-time rendering representations of objects in a view. The computer program product comprises a computer readable storage medium having program instructions embodied therewith. The program instructions are executable by one or more processors, to cause to take steps according to the above method.

Devices, methods, and computer program products embodying the present invention will now be described, by way of non-limiting examples, and in reference to the accompanying drawings.

BRIEF DESCRIPTION OF THE DRAWINGS

The accompanying figures, where like reference numerals refer to identical or functionally similar elements throughout the separate views, and which together with the detailed description below are incorporated in and form part of the present specification, serve to further illustrate various embodiments and to explain various principles and advantages all in accordance with the present disclosure, in which:

FIG. 5A shows a view of a large geographical dataset with hierarchical connections between the nodes overlaid on a map, as it would appear without any clustering of the nodes and edges between the nodes. FIG. 5B depicts the same dataset rendered after having clustered the nodes and propagated edges (as links) between the clusters obtained (as in embodiments). FIG. 6B illustrates a re-clustering process as occurring upon zooming in the view of FIG. 6A, as involved in embodiments.

The accompanying drawings show simplified representations of devices or parts thereof, as involved in embodiments. Similar or functionally similar elements in the figures have been allocated the same numeral references, unless otherwise indicated.

DETAILED DESCRIPTION

The present approach extends known (e.g., grid-based) rendering techniques to the display of nodes of a graph. That is, beyond the (de)clustering processes involves, individual relationships between the nodes are propagated as links between the clusters, which preserve the connectivity. The present methods may rely on specifically designed data structures that enable fast rendering operations. The following description is structured as follows. First, general embodiments and high-level variants are described (sect. 1). The next section addresses more specific embodiments and technical implementation details (sect. 2 and 3).

1. General Embodiments and High-Level Variants

Figure 2:
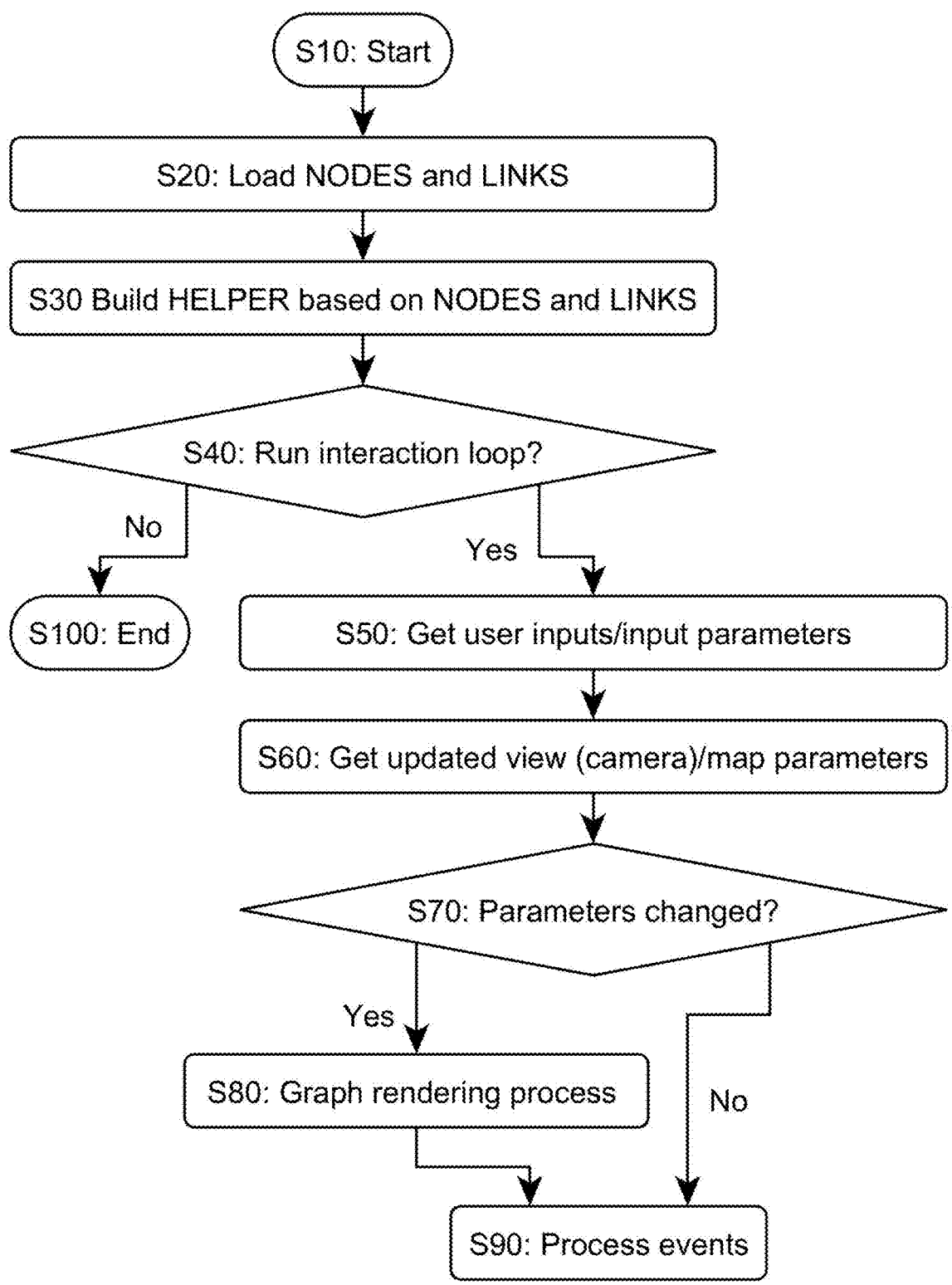
FIGS. 2 and 3 are flowcharts illustrating high-level steps of a method for real-time rendering representations of objects in a view, as in embodiments.
Figure 3:
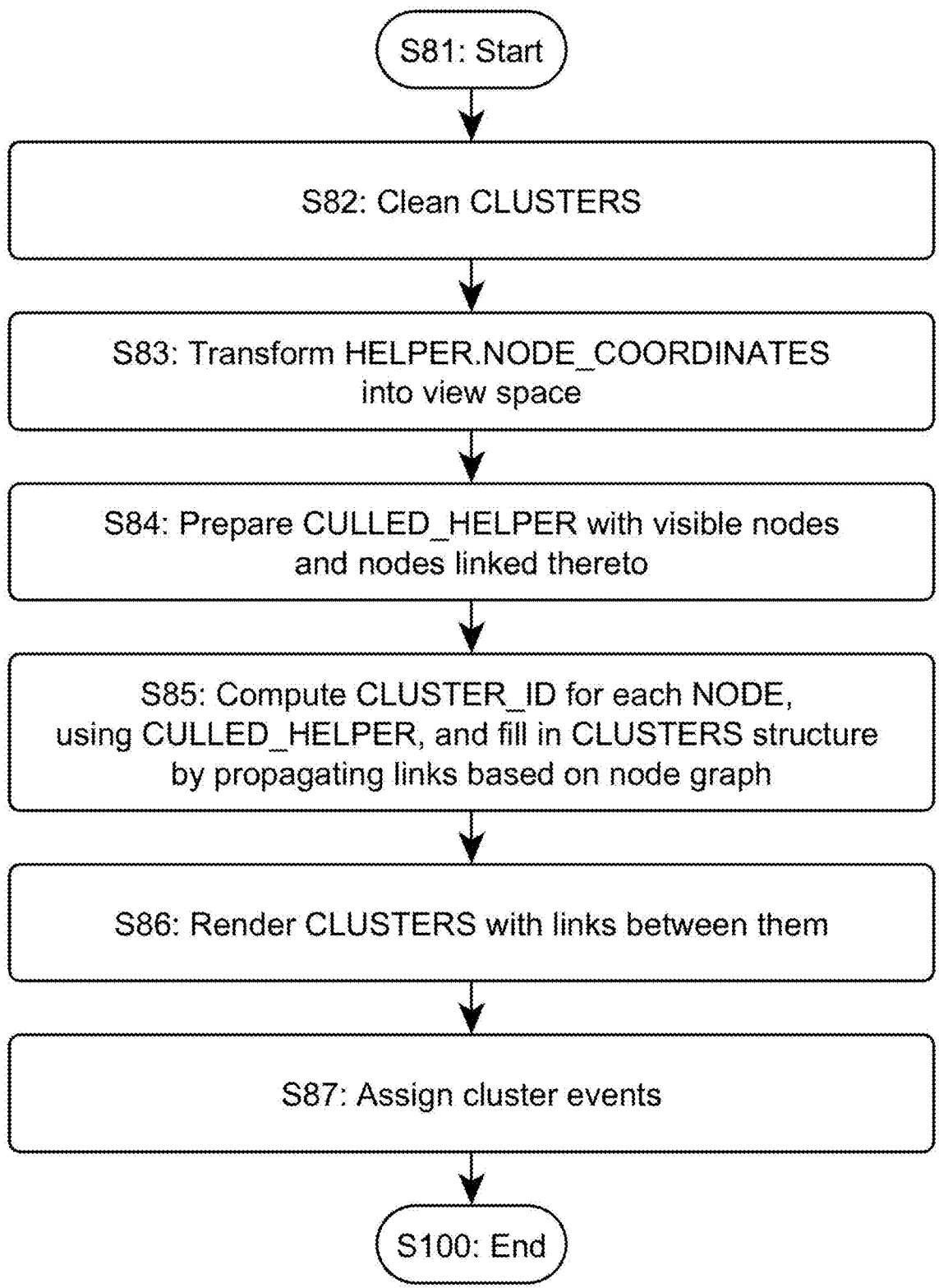
Figures 4A, 4B:
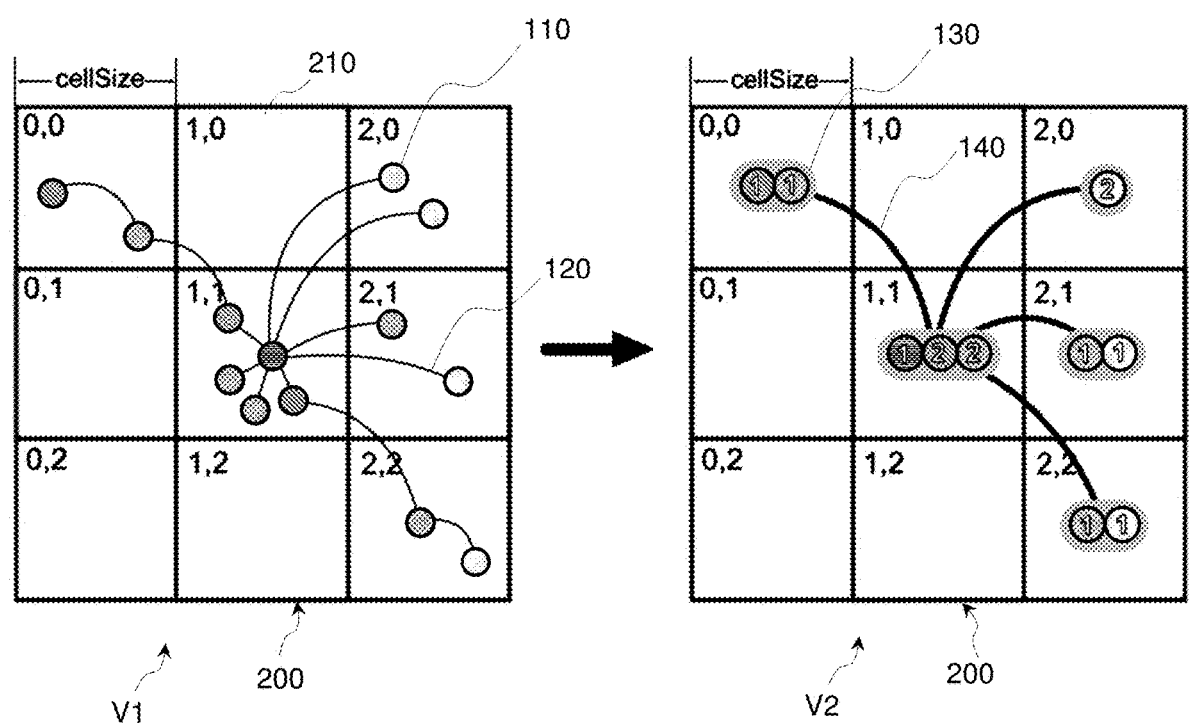
FIGS. 4A and 4B schematically illustrate a node clustering process in which edges between nodes are propagated to the cluster-level; the clustering process relies here on a grid-based approach, as in embodiments.

In reference to FIGS. 2-4B, an aspect of the invention is first described, which concerns a computer-implemented method for real-time rendering representations of objects 130, 140 in a view. As seen in FIGS. 4A, 4B, said objects include clusters 130 of nodes 110 and links 140 between said clusters. The nodes 110 are nodes of a graph structure that further includes edges 120 between the nodes. I.e., said edges are defined as pairs of nodes 110 and such pairs are identified in a dataset capturing this graph. Note, the terminology "edge(s)" is here employed in respect of connections between pairs of nodes in the graph, while "links" refer to connections between the clusters, for the sake of distinction.

Figure 1:
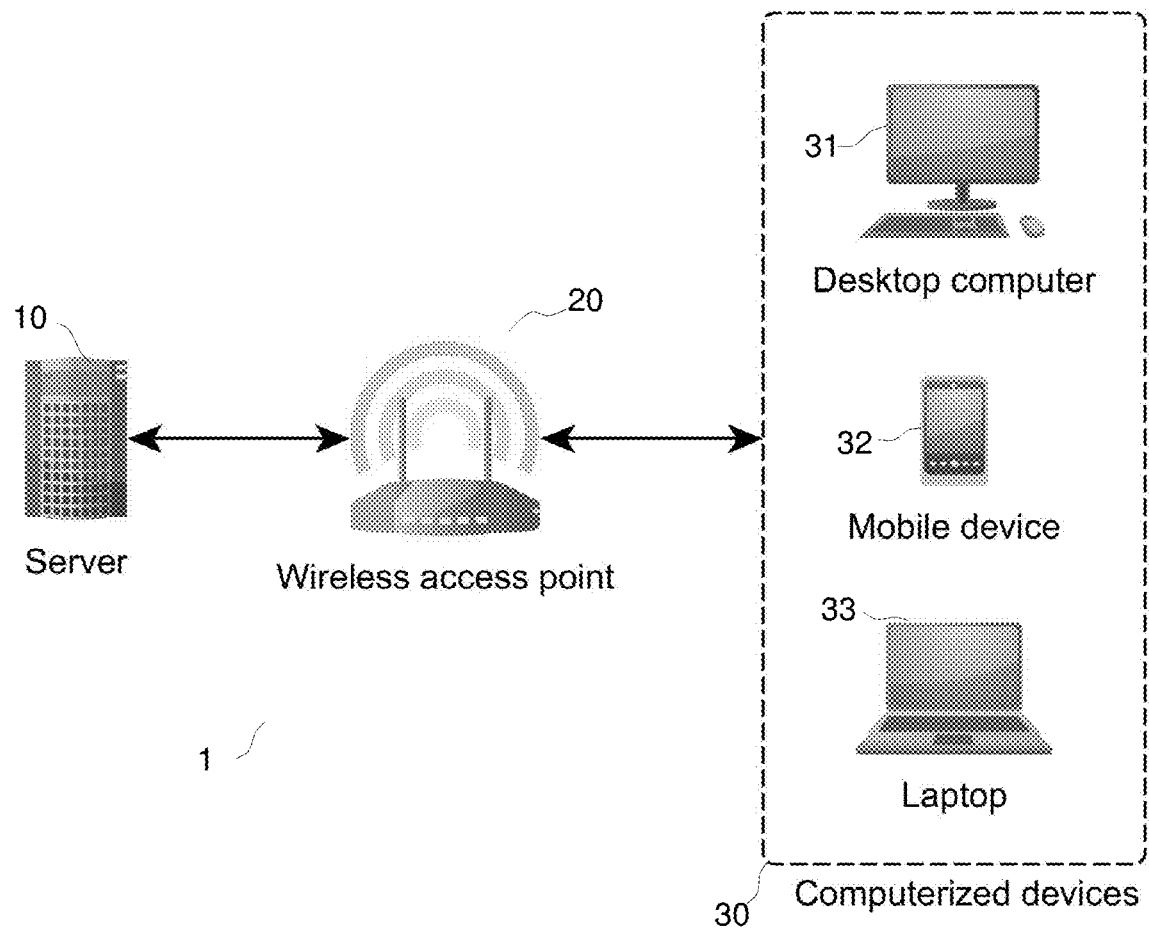
FIG. 1 is a block diagram schematically illustrating selected components of a computerized system, as involved in embodiments.

This method comprises the following steps, which are executed at run-time as a user interacts with a user interface of a computerized device 31-33 (see FIG. 1) that renders computer-generated views. Although the displayed images can be regarded as a two-dimensional set of pixels, the displayed view is a pictorial representation, e.g., a scene, a layout, which may be itself be a representation of 1-dimentional (1D), 2-dimensional (2D) or 3-dimensional (3D) object, in which (or on which) additional objects 130, 140 are to be rendered.

First, user inputs are received S40-S70 (FIG. 2) as a current view (view V1 in FIG. 4A or 6A) is displayed. Note, references SXX denote steps as shown in the specific embodiments of FIGS. 2, 3. Such inputs may notably relate to the current view and/or one or more of the objects 130, 140, e.g., as currently displayed in this view. The user inputs reflect the activity of the user who dynamically interacts with the view, whereby the user intends to, e.g., zoom in or zoom out, and/or to (de)cluster one or more of the node clusters 130, as currently depicted in a view, etc. Such inputs may for example be received via any suitable haptic device (mouse, force feedback device, etc.) and/or other computerized interface means (keyboard, touchscreen, etc.).

A data structure is then updated S82-S85 (see FIG. 3), based on the received user inputs. This data structure associates multiple identifiers, which include cluster identifiers, node identifiers, and link identifiers. That is, at least three sets of identifiers are involved, which respectively identify clusters 130 of nodes, the nodes 110 themselves (which correspond to nodes of the graph structure), as well as links 140 between pairs of clusters.

The data structure is updated S82-S85 as follows. First, properties of the nodes are computed S83-S84. Importantly, such properties relate to properties that the nodes have in the view V2 to be rendered next. They do not directly relate to the properties conferred by the graph of nodes. Such properties are computed based on the user inputs received at steps S40-S70. Taking these properties into account allows, in turn, certain node identifiers to be selected, which correspond to nodes (or clusters thereof) that will have to be depicted in the subsequent view V2. I.e., the selected nodes are nodes that would be depicted in the view V2 in absence of clustering. Next, cluster identifiers associated to the previously selected node identifiers are updated S85 (or re-determined), based on the previously computed properties of the nodes (i.e., properties of the nodes in the view to be rendered next). Finally, link identifiers associated to the updated cluster identifiers are updated S85 too (or re-determined). Contrary to the clusters, the link identifiers are determined S85 according to properties conferred by the graph, i.e., and notably edges 120 between pair of nodes 110 that include, each, at least one node connected to the previously selected node identifiers.

Eventually, representations of clusters 130 and links 140 are rendered S86 in a subsequent view (view V2 in FIG. 4B). Such objects correspond to clusters 130 and links 140 as identified by corresponding identifiers in the updated data structure. This approach may accordingly lead to cluster (or decluster) part or all of the nodes/clusters in the view. In the following, a clustering or declustering process is jointly referred to as a "(de)clustering" process.

In other words, the edges 120 (as captured in the underlying graph structure) linking the nodes impacted by the user interactions are propagated to the cluster-level, while the nodes are (de)clustered according to properties (e.g., pair distances, cell positions) that they will actually have in the subsequent view rather than properties of the graph structure. Thus, the representations of the links 140 rendered (FIG. 4B) correspond, each, to edges 120 of the graph, although the latter are propagated to the cluster-level. Consistently, a single link between two clusters may typically aggregate one, two, or more edges between nodes of these two clusters. Different formats may possibly be used to distinguish links from edges. Also, the line format used for the links may optionally reflect the number of edges aggregated therein. The links can thus be regarded as aggregated representations of the edges. At least some (but not necessarily all) of the clusters and links as identified in the data structure are rendered at step S86. The extent in which such objects are rendered depends on design options. For example, links to non-visible objects may not be rendered when zooming into a view, to improve the readability of resulting view, as assuming in FIG. 6B.

Typically, the data structure is updated S82-S85, and the representations of the clusters 130 and links 140 accordingly rendered S85 within user interaction loops S40-S80, during which user inputs and other parameters are collected S40-S60, in view of modifying S80 a current view. For example, FIGS. 4A and 4B illustrate two different views V1, V2, respectively before and after having aggregated nodes into clusters.

The data structure may for instance consist of an array, which may itself comprise several arrays (e.g., of node identifiers, and link identifiers), and possibly other aggregated data about the clusters, for each entry (e.g., a cluster identifier) of this data structure. The link identifiers may simply consist of an array of cluster identifiers, which identify distinct clusters 130 linked to each entry (a cluster identifier), for example. For example, the data structure may be designed and updated so as to associate each cluster entry to both an array of node identifiers and an array of distinct cluster identifiers. The associated cluster identifiers implicitly define links that result from the edges of the underlying graph structure, once propagated to the cluster-level, as per the update process involved. The data structure may in fact involve several components (e.g., indexes), as described below in detail and exemplified in section 2.

The present approach is simple and robust; it makes it notably possible for the program to be run on tablets or other mobile devices 32 with reduced computational resources. Of course, the present solutions can be run on other usual computerized devices 31, 33, such as desktop computers and laptops, see FIG. 1. This approach can notably be applied to grid-based clustering techniques, used to display decluttered collections of markers. Such techniques do not require heavy pre-processing of input data. They are therefore suited for real-time rendering of a large number of individual markers (points) overlaid on a map. Now, the present solution extends such techniques to nodes 110 of a graph, where edges 120 between the nodes 110 are translated into links 140 between the node clusters 130, thanks to the propagation mechanism described above. That is, during the (de)clustering process, individual relationships (edges) between the nodes impact relationships (links) between clusters. The required associations can be implemented by way of specifically designed data structure components that enable fast rendering.

All this is now described in detail, in reference to particular embodiments of the invention. The present method and its variants are collectively referred to as the "present methods". To start with, the properties of the nodes 110 as computed at steps S83 and S84 (see FIG. 3) may notably include local coordinates of the nodes in the view V2 to be rendered next. Then, the cluster identifiers are updated S85 by comparing the computed coordinates to given, relevant comparands. The computed coordinates can for example be compared to each other (e.g., to determine clusters of closest nodes) or mapped to cells 210 of a grid 200 (see FIGS. 4A, 4B), based on which clusters are then determined. A grid-based approach is mostly assumed in the following, for the sake of illustration. In all cases, such coordinates are compared to relevant comparands, which relate to the view to be rendered next.

Note, the present methods are advantageously applied to geo-spatial graph structures. Examples of geo-spatial graph structures include: map of airplane flights, global map of resource suppliers, maps of corporation location hierarchies (headquarters, subsidiaries, sites, etc.), global computer networks, etc.

For instance, referring to FIGS. 3, 4A, 4B, said coordinates may be geospatial coordinates. Such coordinates may thus be compared so as to map S85 the geospatial coordinates to cells 210 of a grid 200 of the view V2 to be rendered next. In that case, the cluster identifiers are updated S85 based on cells 210 of the grid 200 to which geospatial coordinates are mapped, as illustrated in FIGS. 4A, 4B. In this example, all nodes 110 belonging to a same cell 210 are assumed to be clustered into a same cluster. That is, the cluster identifiers are updated S85 so as for the corresponding clusters 130 to aggregate all nodes 110 belonging to same cell 210.

A culling mechanism may be involved, as seen in FIG. 3. That is, when updating S83-S85 the data structure, only those node identifiers that are effectively "comprised" in the view V2 to be rendered next are selected S84 (though these nodes are not necessarily depicted individually). This selection is performed based the computed properties S83 of the nodes. The cluster identifiers are subsequently updated S85 by comparing coordinates of the sole selected nodes (e.g., to cell positions, see FIG. 4A). Note, nodes that are linked to the selected nodes (owing to edges of the graph structure) may be co-selected by the selection process, be it for depiction purposes.

In embodiments, the data structure involves a cluster index of cluster identifiers, where each entry of the index corresponds to a respective cluster identifier. In that case, the update process S83-S85 amounts to populating S85 the cluster index so as for the latter to associate each entry (a cluster identifier) to: (i) an array of node identifiers (corresponding to nodes captured by the cluster corresponding to this entry); and (ii) an array of distinct cluster identifiers. As noted earlier, the latter define, together with each entry, a corresponding array of links between, on the one hand, the cluster corresponding to said each entry and, on the other hand, clusters corresponding to said distinct cluster identifiers. The cluster index may further associate each entry thereof to respective, aggregated data pertaining to nodes 110 of the corresponding cluster, as discussed in detail in section 2.

Said cluster index may advantageously be populated S85 by accessing a helper index of the node identifiers, whose entries correspond to respective node identifiers. Namely, this additional index associates each entry thereof (a node identifier) to respective linked, i.e., nodes 110 of the graph as linked to said each entry according to edges 120 of the graph. Note, the indexes described herein may be embodied as key-value stores, whereby each index entry can be used a key to quickly get an associated value. This is illustrated in section 2.

In geospatial applications such as evoked above, the helper index further associates each entry (a node identifier) to geospatial coordinates of the corresponding node. As seen in FIG. 2, the helper index can be built during an initial phase S30, prior to receiving S40-S70 user inputs. If necessary, this step S30 can be offloaded to a remote computerized facility, e.g., a server or backend location 10, so as to speed-up execution on the user device 30.

As further seen in FIG. 3, the computation S83 of the properties of the nodes 110 may notably involve a projection of the geospatial coordinates of the nodes in the view V2 to be rendered next, e.g., using a Mercator projection. Such properties need be recomputed each time the view changes (S70: Yes). Note, as the intended alterations to the view will likely impact all cluster definitions of interest, the cluster index can be reset S82 at the beginning of each rendering cycle S80. Unique (persistent) identifiers may be assigned to each object that may potentially be formed, ex-ante. In that case, updates performed at steps S84 and S85 amount to select relevant identifiers amongst the predefined identifiers. In variants, or in addition, a dynamic taxonomy may be used, causing to define temporary identifiers for the clusters, at each rendering cycle.

Referring back to FIG. 2, additional indexes may advantageously be relied on to speed-up the building S30 of the helper index. Namely, step S30 may involve iterations through two additional datasets, consisting of a node index (of the node identifiers) and an edge index (of edge identifiers between pairs of the nodes 110). The node index associates each node identifier to a respective set of geospatial coordinates, while the edge index associates each edge identifier to respective pairs of node identifiers, consistently with edges 120 of the underlying graph structure. These additional indexes can be provided S20, each, as a flat, serializable dataset.

Figure 6A:
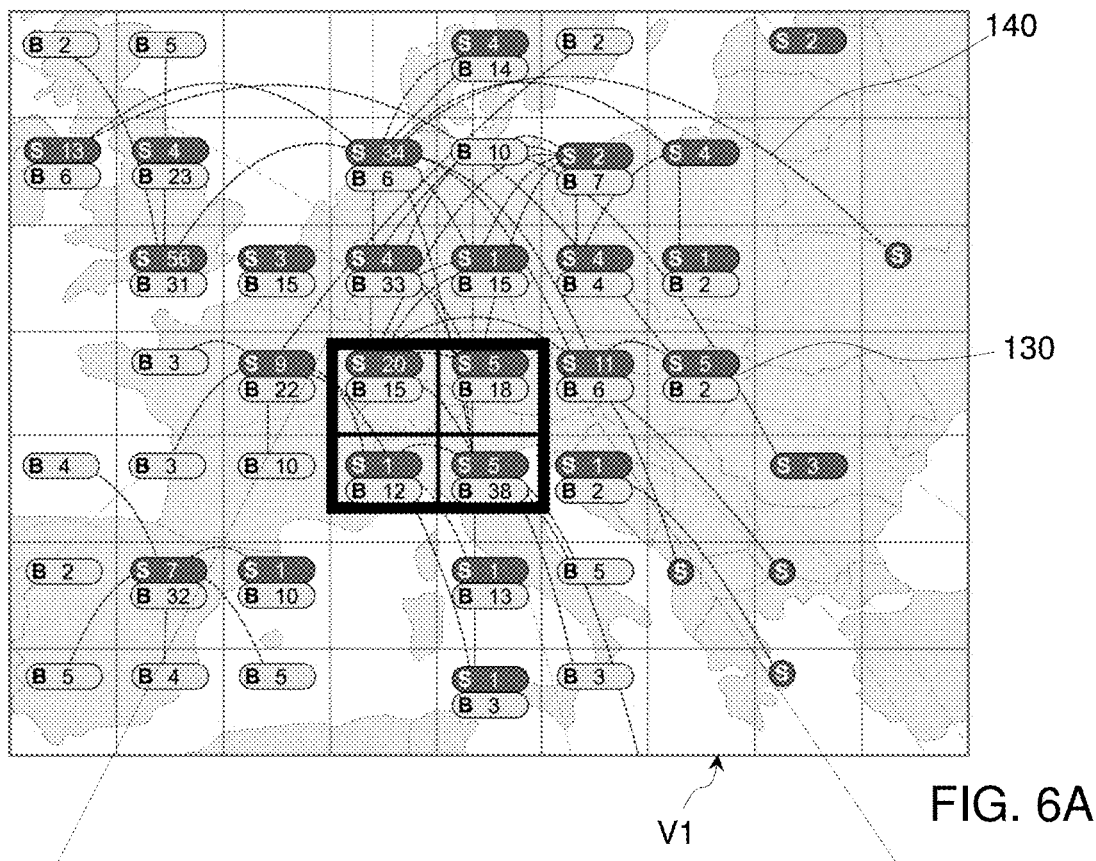
Figure 6B:
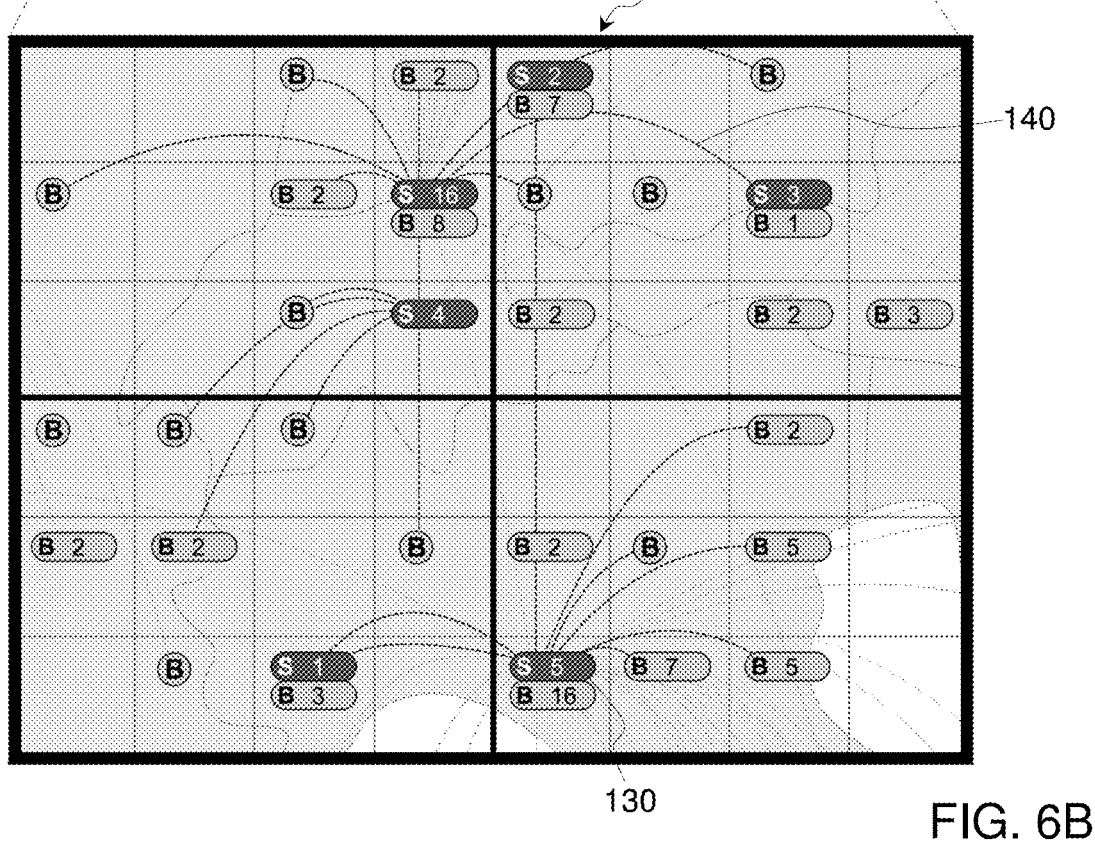

In practice, the user inputs received at steps S40-S70 may for example aim at zooming in a current view V1, see FIG. 6A. In that case, a set (at least) of the updated cluster identifiers will correspond to a "declustered" version of a cluster as rendered in the current view V1. I.e., a single cluster in the current view V1 gives rise S86 to several clusters in a subsequent view V2 (compare FIGS. 6A and 6B). FIG. 6B shows a magnified (zoomed in) portion of FIG. 6A, in which clustered objects have been "declustered". As mentioned earlier, links to objects that are not visible in the view of FIG. 6B are not rendered in this case.

Eventually, and depending on the current magnification, the declustering process may lead to display single nodes, instead of clusters thereof. In all cases, the rendered representations of the clusters 130 may possibly embed visual indications as to the embedded nodes/clusters. Such depictions may for instance be selected (on-the-fly) based on node identifiers associated to cluster identifiers corresponding to the rendered representations of the clusters, via the data structure (the cluster index), as illustrated in FIGS. 4A-6B.

Conversely, the user inputs may, at times, aim at zooming out. In that case, one or more of the updated cluster identifiers will correspond, each, to two or more clusters of the current view. Note, there are other situations which may lead to a (de)clustering process, irrespective of zooming out or in the view. For example, a feature tree may be superimposed on the view, which contains selectable (expandable) clusters. Thus, the user may choose to expand nodes/clusters as displayed in the feature tree, which results in expanding a corresponding cluster overlaid on the map. And conversely the user may want to contract nodes/clusters as currently expanded in the feature tree. More generally, many navigation options may be offered S60 to the user, as known per se. Using such options may accordingly lead to alter a current view (e.g., and lead to a change in the camera viewpoint, the magnification, the layout, etc.) and, therefore, to (de)cluster part or all of the current clusters and/or nodes. Also, system inputs (e.g., automatic rescaling) may come in addition to user inputs, which may impact the view.

Finally, and as suggested in FIG. 2, the present methods will likely involve repeated rendering cycles S40-S80. A rendering process step S80 is normally performed each time a change in the parameters is detected S70, though cinematic considerations may lead to skip some of the rendering steps, e.g., when fast user inputs are detected (as may for instance occur with force-feedback devices).

At present, referring back to FIG. 1, another aspect of the invention is now briefly described, which concerns a computerized device 31, 32, or 33. Such a device is used to implement any of the methods described above. In embodiments, several devices 30 may be concurrently used to explore a same map, for example. Such devices 30 may for example be set in data communication with a server or a backend processing device 10, e.g., via a wireless access point 20, for the purpose of downloading (on-demand) additional parts of a layout and/or offloading some of the computational steps. Thus, one understands that the present invention may possibly be implemented with a plurality of devices 10-30, e.g., as a computerized system 1 or a network of such devices 10-30.

The computerized devices 31, 32, 33 comprise, each, a display, some processing means, and a memory. The latter is here assumed to store suitable computerized methods, which, upon execution by the processing means, will cause to perform steps as described earlier, i.e., receive user inputs, update a data structure, and accordingly render representations of clusters and links. Note, however, that some of the steps (like step S30) may be offloaded to a remote entity.

Similarly, and according to another aspect, the present invention can be embodied as a computer program product. Additional aspects of such computerized devices and computer program products are discussed in section 3.

The above embodiments have been succinctly described in reference to the accompanying drawings and may accommodate a number of variants. Several combinations of the above features may be contemplated. Examples are given in the next section.

2. Specific Embodiments

This section describes embodiments, which aim at achieving a particularly efficient way to declutter complex, geo-spatial graphs by clustering the nodes of the graph and aggregating the relationships of the nodes at the cluster-level.

2.1 Data Structures

The following data structures are relied upon in some embodiments. Such data structures are illustrated as tables (arrays), for the sake of illustration, it being understood that they could be stored and/or called using any appropriate software and/or hardware format.

2.1.1 Input Data

Inputs may consist of two flat serializable datasets that maintain the individual nodes' data and relationships between the nodes, consistently with the associated graph structure.

2.1.1.1 Node Index ("NODES")

| NODE_ID | NODE_COORDINATES | NODE_ATTRIBUTES |
|---|---|---|
| Node_ID1 | Coordinates of Node_ID1 {Comment: used in geo-located graph applications (e.g., latitude, longitude)} | Attributes of Node_ID1 {optional} |
| Node_ID2 | Coordinates of Node_ID2 | Attributes of Node_ID2 |
| ... | ... | ... |

2.1.1.2 Edge Index ("EDGES")

| EDGE_ID | NODE_ID#1 | NODE_ID#2 | EDGE_ATTRIBUTES |
|---|---|---|---|
| Edge_ID1 | Node-ID#1 for Edge_ID1 | Node-ID#2 for Edge_ID1 | Attributes of Edge_ID1 {optional} |
| ... | ... | ... | ... |

2.1.1.3 Helper Index ("HELPER", for Fast Input Data Access)

In embodiments, the method iterates through NODES and EDGES datasets to create a HELPER index as a fast way to access the input records (NODES, EDGES). In case the (NODES, EDGES) graph is static, the HELPER index need be created only once, during the loading phase S20. In such a scenario, this preparation step can be offloaded to some backend service 10.

| NODE_ID (Key) | NODE_EDGES | NODE_COORDINATES | NODE_ATTRIBUTES |
|---|---|---|---|
| Node_ID1 | {References to records from NODES dataset}. | Coordinates of Node_ID1 | Attributes of Node_ID1 {optional} |
| ... | ... | ... | ... |

The HELPER Index is used to allow fast access to input data (NODE, EDGES) by NODE_ID during the (de)clustering steps.

2.1.1.4 Cluster Index ("CLUSTERS", Maintaining Current Cluster Data)

| CLUSTER_ID (Key) | NODES_IN_CLUSTER | CLUSTER_LINKS | CLUSTER_ATTRIBUTES |
|---|---|---|---|
| Cluster_ID1 | Array of Node_IDs corresponding to Cluster_ID1 | Array of Cluster_IDs forming links to Cluster_ID1 | Aggregated data about Cluster_ID1 {optional} |
| ... | ... | ... | ... |

The CLUSTERS index maintains clustering information for the nodes. Each record can be easily accessed via its CLUSTER_ID (a key) and contains references to corresponding nodes. Additionally, it contains references to other clusters, which form links thereto.

CLUSTERS[index].CLUSTER_ATTRIBUTES store arbitrary information, which may for example include the type of cluster or list of NODE types located in this cluster. Moreover, additional properties may be placed here, inherited or aggregated from the nodes composing the clusters. The HELPER index can be used to quickly get pointers to actual node data and access their coordinates and links.

2.1.2 Building the Cluster Index from View Space Coordinates (X, Y)—Grid-Based Approach Prior to clustering and drawing the nodes, a preparation S83 of the nodes' coordinates is typically needed. The "world space" coordinates may for instance be transformed into 2D "view space" (or "screen space") coordinates. This transformation depends on the projection method chosen. Various map projections can be contemplated, such as Mercator projection. Other projection or transformation mechanisms may possibly be relied on, as the skilled person will appreciate.

Having transformed the view space coordinates for each node (NODE_X, NODE_Y), and assuming that cells 210 of the grid 200 are square cell (for simplicity), a CLUSTER_ID may for example be built (for any given NODE_X, NODE_Y coordinates) as follows (using JavaScript-like instructions):

cellX=Math.floor(x/cellSize);
cellY=Math.floor(y/cellSize); and
clusterIndex=cellX+"_"+cellY.

In the above instructions, CELL_SIZE represents the size of one grid cell (in the view space) and CELL_X, CELL_Y denotes the coordinates of a cell (in the view space).

This results in clustering individual nodes (markers), while preserving edges between the nodes, by propagating them at the cluster-level (see the thick lines in FIG. 4B).

2.2 Description of an Embodiment of the Approach 2.2.1 Rendering

First, data pertaining to NODES.NODE_COORDINATES are transformed into the view space (step S83). Second, nodes can be culled, to save some computational resources. That is, only the nodes that fit into the "viewable" area (or directly linked to such nodes) are retained. Third, CLUSTERS are populated (step S85), taking care of properly addressing edges between the nodes. This can be efficiently achieved by getting nodes' edges via the HELPER index. Finally, clusters are rendered by accessing the CLUSTERS index. Note, cluster links can advantageously be rendered in the same pass as for each individual cluster.

2.2.2 Events

The same CLUSTERS structure can be used (based on culled screen-space nodes, S84) to process S87, e.g., mouse- (or touch-) driven events on cluster markers and links, if needed.

2.3 Application Pipeline (Preparation, Event Processing)

An embodiment of an application pipeline is captured in the flowcharts of FIGS. 2 and 3. Such an approach makes it possible to render relatively large graph structures in real-time on average consumer hardware (desktop and mobile) at the client side.

This approach is illustrated in FIGS. 5A-6B, which depict (selection from) the hierarchical organization of various offices of a global company around the world. For illustration purposes offices (nodes) are here classified into head-quarters (HQ), subsidiaries (S), and branches (B). Note, clusters are represented as aggregated pictorial representations of their components, where the number of corresponding components appears next to relevant initials HQ, B, and S.

Figure 5A:
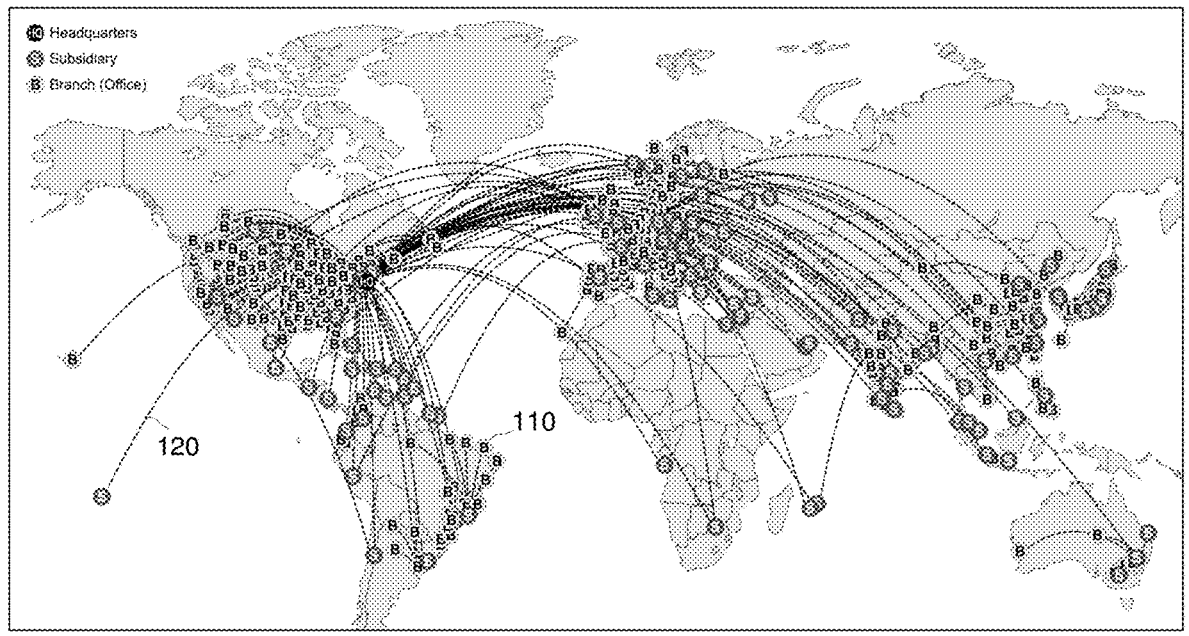
FIGS. 5A, 5B, 6A and 6B are views illustrating rendering methods as involved in embodiments. In detail.
Figure 5B:
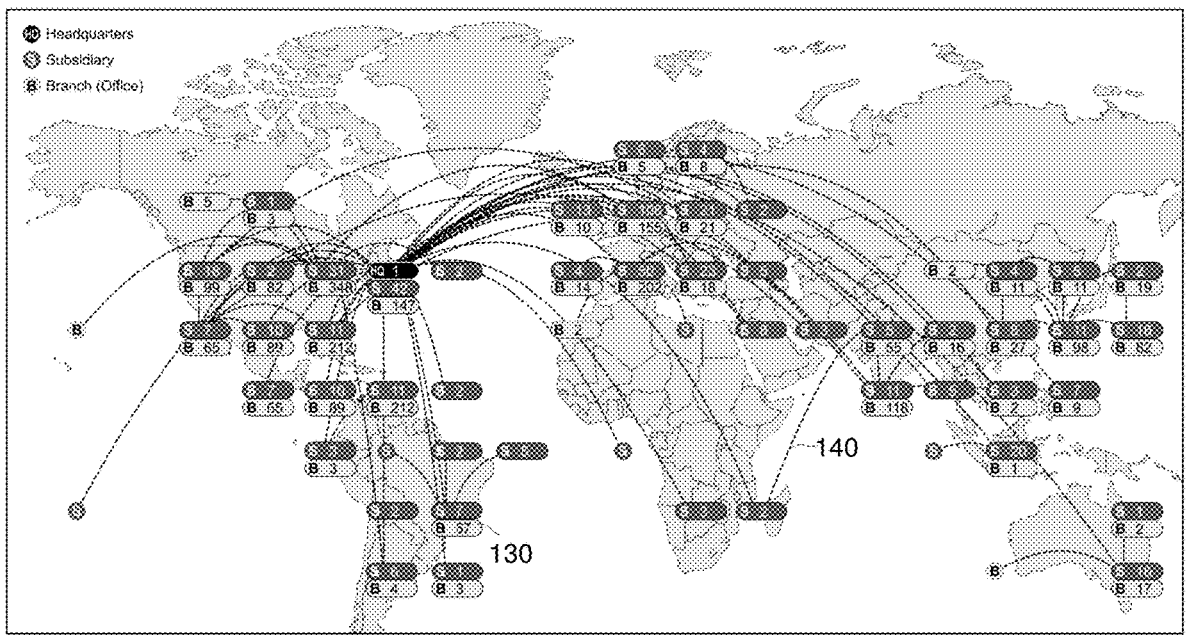

FIG. 5A illustrates a large geographical dataset with hierarchical connections, without any clustering, which is difficult to read, whereas FIG. 5B renders the same dataset after clustering, while preserving relationships between individual nodes by propagating this information to the cluster-level.

Moreover, the present approach allows fast (real-time) re-clustering, as illustrated in FIGS. 6A and 6B.

In embodiments, a computer-implemented method of real-time rendering representations of objects in a view is disclosed. Said objects may include at least clusters of nodes of a graph structure and links between said clusters. The graph structure comprises at least edges defined as pairs of the nodes, in addition to said nodes. The method can include at least the following steps, all performed at run-time. User inputs in respect to a current view and/or one or more of the objects are received. A data structure is updated, which associates multiple identifiers. The latter include at least cluster identifiers, node identifiers, and link identifiers, which respectively identify clusters of nodes, nodes of said graph, and links between pairs of clusters. The data structure is updated as follows. Properties of nodes in the view to be rendered are computed based on the user inputs received, and corresponding node identifiers are selected. Cluster identifiers associated with the selected node identifiers are updated, based on the computed properties of the nodes. Link identifiers associated with the updated cluster identifiers are updated, according to edges between pair of nodes connected to the selected node identifiers. In some embodiments, after having updated the data structure, representations of clusters and links as identified by corresponding cluster identifiers and associated link identifiers in the updated data structure are eventually rendered in the view. Related devices and computer program products are also disclosed.

2. Technical Implementation Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been described with reference to a limited number of embodiments, variants and the accompanying drawings, it will be understood by those skilled in the art that various changes may be made, and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

What is claimed is:

1. A computer-implemented method of real-time rendering representations of objects in a view, said objects including clusters of nodes of a graph structure and links between said clusters, wherein the graph structure comprises edges defined as pairs of the nodes, in addition to said nodes, and wherein the method comprises, at run-time:

receiving user inputs in respect to a current view;

updating a data structure that associates multiple identifiers, the multiple identifiers including at least cluster identifiers, node identifiers, and link identifiers, wherein said multiple identifiers respectively identify clusters of nodes, nodes of said graph, and links between pairs of clusters, and wherein the data structure is updated by at least:
   computing properties of nodes in the view to be rendered, based on the user inputs received, and selecting corresponding node identifiers,
   updating cluster identifiers associated to the selected node identifiers, based on said computed properties, and
   updating link identifiers associated to the updated cluster identifiers, according to edges between pair of nodes connected to the selected node identifiers; and
rendering representations of clusters and links as identified by corresponding cluster identifiers and associated link identifiers in the updated data structure.

2. The method according to claim 1, wherein
computing said properties of the nodes comprises computing coordinates of the nodes in the view to be rendered, whereby the cluster identifiers are updated by comparing the computed coordinates to comparands.

3. The method according to claim 2, wherein
said coordinates are geospatial coordinates and the computed coordinates are compared so as to map said geospatial coordinates to cells of a grid of the view to be rendered, whereby the cluster identifiers are updated based on cells of the grid to which said geospatial coordinates are mapped.

4. The method according to claim 3, wherein
the cluster identifiers are updated so as for corresponding clusters to aggregate all nodes belonging to a same one of the cells.

5. The method according to claim 3, wherein,
at updating the data structure, said corresponding node identifiers are identified by selecting, out of nodes of the graph, nodes that are actually comprised in the view to be rendered, based on the computed properties of the nodes, whereby the cluster identifiers are updated by comparing coordinates of the sole selected nodes to said comparands.

6. The method according to claim 1, wherein
said data structure comprises a cluster index of cluster identifiers, and
updating the data structure comprises populating said cluster index so as for the cluster index to associate each of the cluster identifiers to both an array of node identifiers and an array of distinct cluster identifiers, the latter defining, together with said each of the cluster identifiers, a corresponding array of links between, on the one hand, said each of the cluster identifiers and, on the other hand, said distinct cluster identifiers.

7. The method according to claim 6, wherein
populating said cluster index comprises accessing a helper index of the node identifiers, which associates each of the node identifiers to respective nodes of the graph as linked to a node corresponding to said each of the node identifiers, according to said edges.

8. The method according to claim 7, wherein
the helper index further associates each of the node identifiers to geospatial coordinates of the respective nodes, and
the method further comprises building the helper index, prior to receiving said user inputs.

9. The method according to claim 8, wherein computing the properties of the nodes further comprises:
   computing a projection of geospatial coordinates of said respective nodes in the view to be rendered.

10. The method according to claim 8, wherein
building the helper index comprises accessing two datasets, the datasets including at least a node index of the node identifiers and an edge index of edge identifiers between said pairs of the nodes, wherein the node index associates each of the node identifiers to respective geospatial coordinates and the edge index associates each of the edge identifiers to respective pairs of node identifiers, consistently with said edges of the graph.

11. The method according to claim 8, wherein
the node index and the edge index are provided, each, as a flat, serializable dataset.

12. The method according to claim 8, wherein
the step of building the helper index is offloaded to a remote computerized facility.

13. The method according to claim 6, wherein
the cluster index further associates each of the cluster identifiers to respective, aggregated data pertaining to nodes of a cluster corresponding to said each of the cluster identifiers.

14. The method according to claim 1, wherein
the user inputs received aim at zooming in a current view, such that a set, at least, of the updated cluster identifiers corresponds to a declustered cluster of nodes as rendered in the current view prior to rendering said representations.

15. The method according to claim 1, wherein
the user inputs received aim at zooming out, such that at least one of the updated cluster identifiers correspond, each, to two or more clustered clusters as rendered in a current view prior to rendering said representations.

16. The method according to claim 1, wherein
each of the rendered representations of the clusters embeds visual depictions selected based on node identifiers associated to cluster identifiers corresponding to said rendered representations of the clusters.

17. The method according to claim 1, wherein
the method comprises repeated rendering cycles, each comprising said steps of: receiving user inputs; updating the data structure; and rendering representations of clusters and links as identified by corresponding cluster identifiers and associated link identifiers in the updated data structure.

18. A computerized device comprising a display, a processor, and a memory comprising computerized methods for real-time rendering representations of objects in a view, said objects including clusters of nodes of a graph structure and links between said clusters, wherein the graph structure comprises edges defined as pairs of the nodes, in addition to said nodes, and wherein the processor is configured, when executing said methods, to cause to:
   receive user inputs in respect to a current view as displayed in the display;
   update a data structure that associates multiple identifiers, the multiple identifiers including at least cluster identifiers, node identifiers, and link identifiers, wherein said multiple identifiers respectively identify clusters of nodes, nodes of said graph, and links between pairs of clusters, and wherein the data structure is, in operation, updated by at least:
      computing properties of nodes in the view to be rendered, based on the user inputs received, and selecting corresponding node identifiers, updating cluster identifiers associated to the selected node identifiers, based on said computed properties, and updating link identifiers associated to the updated cluster identifiers, according to edges between pair of nodes connected to the selected node identifiers; and render representations of clusters and links as identified by corresponding cluster identifiers and associated link identifiers in the updated data structure.

19. A computer program product for real-time rendering representations of objects in a view, said objects including clusters of nodes of a graph structure and links between said clusters, wherein the graph structure comprises edges defined as pairs of the nodes, in addition to said nodes, the computer program product comprising a computer readable storage medium having program instructions embodied therewith, the program instructions executable by a processor, to cause, at run-time, to:

receive user inputs in respect to a current view;

update a data structure that associates multiple identifiers, the multiple identifiers including at least cluster identifiers, node identifiers, and link identifiers, wherein said multiple identifiers respectively identify clusters of nodes, nodes of said graph, and links between pairs of clusters, and wherein the data structure is updated by at least:

computing properties of nodes in the view to be rendered, based on the user inputs received, and selecting corresponding node identifiers, updating cluster identifiers associated to the selected node identifiers, based on said computed properties, and updating link identifiers associated to the updated cluster identifiers, according to edges between pair of nodes connected to the selected node identifiers; and render representations of clusters and links as identified by corresponding cluster identifiers and associated link identifiers in the updated data structure.

* * * * *